United States Patent [19]

Skinner

[11] Patent Number: 4,638,765
[45] Date of Patent: Jan. 27, 1987

[54] HEAT RECOVERY SYSTEM

[75] Inventor: Geoffrey F. Skinner, Reading, England

[73] Assignee: Foster Wheeler Energy Corporation, Livingston, N.J.

[21] Appl. No.: 791,175

[22] Filed: Oct. 24, 1985

[51] Int. Cl.⁴ .............................................. F22D 1/00
[52] U.S. Cl. .................................. 122/7 R; 122/421; 122/470
[58] Field of Search .................... 122/7 R, 406 S, 420, 122/421, 470; 60/39.182, 39.02

[56] References Cited

U.S. PATENT DOCUMENTS

| 3,919,839 | 11/1975 | Aguet | 60/39.18 B |
|---|---|---|---|
| 3,953,966 | 5/1976 | Martz et al. | 60/39.02 |
| 3,965,675 | 6/1976 | Martz et al. | 60/39.18 |
| 3,992,876 | 11/1976 | Aguet | 60/39.12 |
| 4,160,805 | 7/1979 | Inaba et al. | 422/180 |
| 4,253,300 | 3/1981 | Willyoung | 60/39.18 B |
| 4,261,167 | 4/1981 | Paull et al. | 60/39.02 |
| 4,353,206 | 12/1982 | Lee | 60/39.18 B |
| 4,354,347 | 10/1982 | Tomlinson | 60/39.18 B |
| 4,394,813 | 7/1983 | Tanaka et al. | 60/618 |
| 4,501,233 | 2/1985 | Kusaka | 122/7 R |

Primary Examiner—Edward G. Favors
Attorney, Agent, or Firm—Marvin A. Naigur; Robert D. Bajefsky; John E. Wilson

[57] ABSTRACT

A gas turbine heat recovery system that can be used in steam reforming plants is disclosed. The system utilizes a high pressure steam superheater and a high pressure feedwater heater to recover the heat from the exhaust gas turbine.

13 Claims, 2 Drawing Figures

WASTE HEAT EXCHANGER

HEAT RECOVERY SYSTEM

This invention relates to a heat recovery system. In particular it relates to a heat recovery system for gas turbine exhaust. In a specific embodiment it relates to a heat recovery system for gas turbine exhaust in a steam reforming plant.

Many process plants have been built incorporating steam systems operating at evaporation pressures of around 100 atmospheres. Most of these plants are used to produce ammonia synthesis gas by the steam reforming of natural gas.

The main reason for adopting this rather high steam generation pressure in these plants, relative to contemporary process plant practice of 40–60 atmospheres, is that about half the steam generated in these plants is needed at around 40 atmospheres for the steam reforming process, and a substantial amount of power can be produced by expansion of the steam from a higher pressure to this extraction pressure of around 40 atmospheres. The balance of the steam is used in condensing steam turbines, mainly driving compressors and pumps.

Many industries that need both electric power and process heat are installing so-called gas turbine cogeneration systems. Most of these consist of a gas-fired open cycle gas turbine generating electricity, with the turbine exhaust at about 1000° F. passing through a waste heat boiler to generate steam. The high thermal efficiency of these cogeneration plants, which can exceed 70%, allows them to produce electric power and process heat at low cost.

In these cogeneration plants, the gas turbine exhaust at about 1000° F. is first used to generate (and sometimes to superheat) process steam. The generation pressure is normally under 40 atmospheres. The exhaust gases are then used to generate further steam at low pressure. This is used for boiler feed-water heating and deaerating, and occasionally in a steam turbine. The cooled exhaust gas leaves the waste heat boiler at 250° to 300° F.

Studies have been made on installing these gas turbine cogeneration systems on the large steam reforming plants referred to above, with integration of the gas turbine heat recovery with the existing 100 atmosphere steam systems. At first sight, this would improve the economics of operation, through generation of electric power for plant use at high thermal efficiency.

There is however a problem with this concept, arising from the evaporation temperatures of around 600° F. associated with 100 atmosphere steam generation. The proportion of the heat available in the gas turbine exhaust at 1000° F. that can be used for high pressure steam generation is thus quite limited. The lowest exhaust temperature at the outlet of the high pressure feedwater heater is around 500° F., and heat recovery beneath that temperature level to low pressure steam generation represents a low grade of heat recovery.

The instant invention allows a higher proportion of the heat available in the gas turbine exhaust to be used for the production of 100 atmosphere steam or steam at similar high pressures.

SUMMARY OF THE INVENTION

According to the instant invention, gas turbine exhaust is passed through a waste heat exchanger consisting of a high pressure steam superheater and a high pressure feedwater heater, where the exhaust gas first contacts the high pressure steam superheater and then contacts the high pressure feedwater heater. This invention is also directed to a process for producing high pressure steam using gas turbine exhaust, a waste heat exchanger and a separate evaporator comprising passing the exhaust through the waste heat exchanger where the exhaust first contacts a high pressure steam superheater and then contacts a high pressure feedwater heater.

This invention is further directed to a heat recovery system comprising a gas turbine, a waste heat exchanger and a separate evaporator where said waste heat exchanger consists of a means for passing exhaust gas from the turbine to the exchanger, the exchanger containing a high pressure steam superheater and a high pressure feedwater heater. This combination allows for an increased production of high pressure steam in the complete steam system over prior art gas turbine heat recovery systems employing waste heat boilers.

DESCRIPTION OF THE PREFERRED EMBODIMENT

Figure 1:
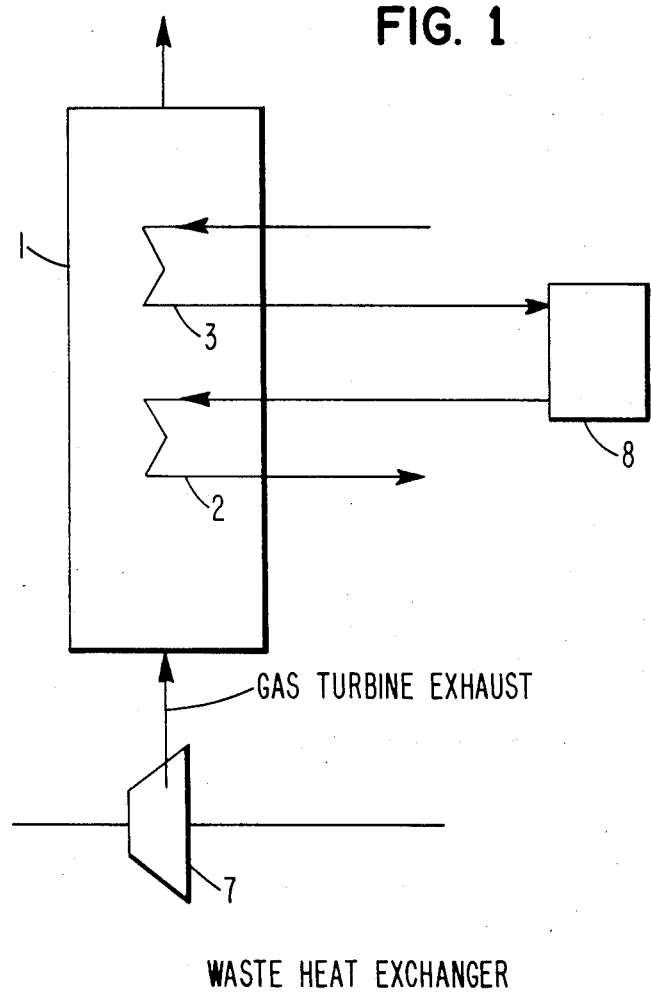
FIG. 1 shows a schematic view of an example of the instant invention's heat recovery system.

According to the instant invention, and as shown by example in FIG. 1, gas turbine exhaust from gas turbine 7, which is at a temperature ranging from about 900 deg. to about 1200 deg. F., but preferably around 1000 deg. F., enters into a waste heat exchanger 1. There it contacts a high pressure steam superheater 2 through which is passed saturated steam from a steam generator, 8. The steam is at elevated pressures ranging from about 90 to 150 atmospheres but preferably around 100 atmospheres and a temperature generally around about 550 deg. to about 650 deg. F. Although the steam flow rate can be any suitable flow rate, generally the flow rate will range from about 50,000 pounds per hour to about 150,000 pounds per hour. The steam generator can be any type of evaporator system, such as a stream drum in a reformer unit. This steam is superheated in a high pressure steam superheater 2, with the exhaust of the gas turbine, to steam at a temperature of around 800 deg. to about 1000 deg. F., depending upon the temperature of the gas turbine exhaust.

The gas turbine exhaust then contacts high pressure feedwater heater 3 in which water is heated from a temperature ranging from about 200 deg. to about 500 deg. F. to a temperature ranging from about 400 deg to about 600 deg. F. The high pressure feedwater heater is maintained at a pressure ranging from about 90 to about 150 atmospheres. Any suitable flow rate can be used with this heater, but generally the flow rate ranges from about 400,000 to about 600,000 pounds per hour.

Figure 2:
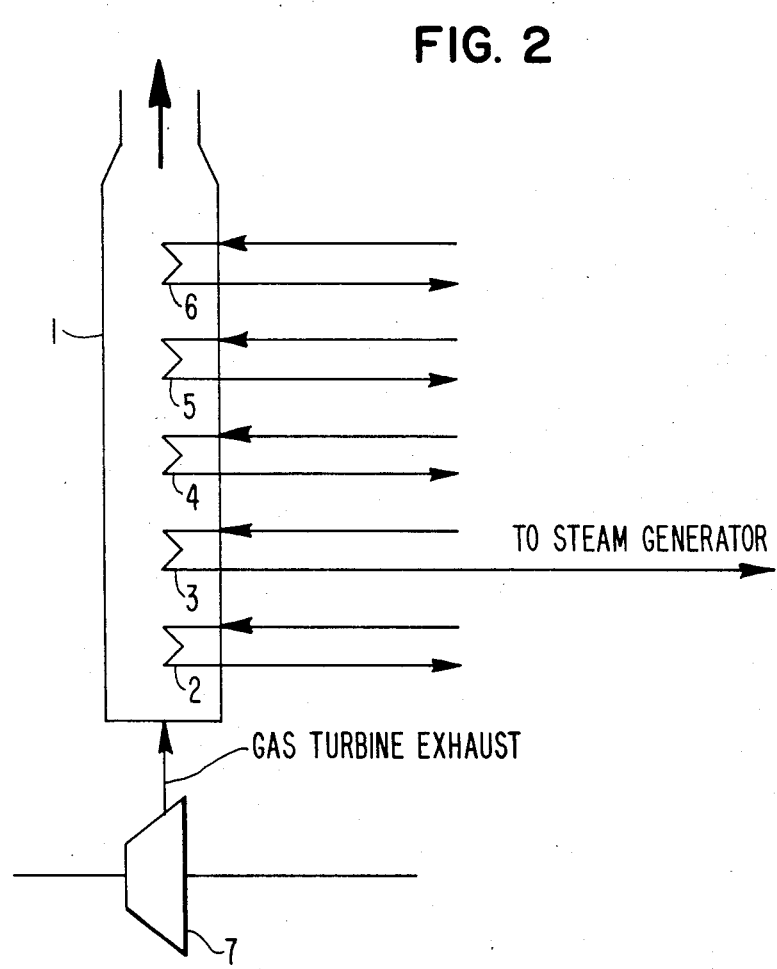
FIG. 2 show a schematic view of another example of the instant invention's heat recovery system in a steam reforming plant.

The gas turbine exhaust, as shown in FIG. 2, can then be contacted with exchangers such as a feed gas heater 4, a fuel gas heater 5 and a low pressure feedwater heater 6. The gas turbine exhaust can also contact a second high pressure feedwater heater, a steam/deaerated water heater, or any other type of exchanger. The gas turbine exhaust then exits the waste heat exchanger at a temperature ranging from about 250 deg to about 450 deg. F.

The use of the high pressure superheater 2 replaces the combination of superheater and evaporator, in series on the steam side, that is usually used in waste heat boilers. This eliminates the need for extra high pressure steam drums and circulating pumps, and also affords improved control over the temperature of the overall plant superheated steam supply to the turbines.

Additionally, the high pressure boiler feedwater that is heated in the high pressure feedwater heater 3 with the gas turbine exhaust is then evaporated in a separate evaporator 8, outside the subject waste heat exchanger. The saturated steam thus produced is then heated in high pressure steam superheater 2 to form superheated steam. The feedwater heater 3, replaces the low pressure steam generation system that is normally used in prior waste heat boilers and contributes directly to the amount of high pressure steam produced elsewhere in the plant. This was not the case with the low pressure steam generation system.

THEORETICAL EXAMPLE

This example of the invention is shown in FIG. 2.

Gas turbine exhaust enters a multi-service heat exchanger provided with five heat-exchanger surfaces, numbered from 2 to 6, which recover heat for use in an adjacent ammonia plant. The cooled exhaust gas is then discharged to the atmosphere.

At the base of the exchanger, 571,417 lb/hr of gas turbine exhaust enters the exchanger at a temperature of 986° F. The exhaust first passes over high pressure steam superheater, in which 100,000 lb/hr of 1550 p.s.i.g. saturated steam is heated from 603° F. to 860° F. The heat removed is 23.7 mm BTU/hr.

The exhaust, which is now at a temperature of 836° F., next passes over high pressure feedwater heater 3 in which 492,720 lb/hr of boiler feed water at 2,000 p.s.i.g. and 427° F. is heated to 523° F. The heat removed is 53.5 mm BTU/hr.

The exhaust, now at a temperature of 479° F., passes over feed gas heater 4, in which 2543 lb mol/hr of natural gas at 600 p.s.i.g. and 55° F. is heated to 420° F. The heat removed is 8.9 mm BTU/hr.

The exhaust at a temperature of 418° F. passes over fuel gas heater 5, in which 1678 lb mol/hr of natural gas at 300 p.s.i.g. and 55° F. is heated to 360° F. The heat removed is 4.8 mm BTU/hr.

Finally, the exhaust at a temperature of 385° passes over low pressure feedwater heater 6, in which 168,000 lb/hr of boiler feedwater at 120 p.s.i.g. and 240° F. is heated to 300° F. The heat removed is 10.3 mm BTU/hr and the exhaust gas is discharged to the atmosphere at 314° F.

The total of the heat recovered in the five heat exchange surfaces is thus 101.2 mm BTU/hr.

It is to be understood that the heat exchange surfaces described above can be interleaved if desired, so as to achieve a more economical use of constructional materials, and consequently the inter-surface temperatures given are subject to some variation.

This example is intended to be exemplary. Other embodiments within the scope of this invention are intended to be included.

I claim:

1. A process for recovering heat from gas turbine exhaust comprising passing said exhaust through a waste heat exchanger consisting of a high pressure steam superheater and a high pressure feedwater heater where said exhaust gas first contacts said high pressure steam superheater and then contacts said high pressure feedwater heater.

2. A process according to claim 1 where said exhaust gas ranges from a temperature of about 900° to about 1200° F.

3. A process according to claim 1 where said high pressure feedwater heater is supplied with water at a temperature of about 200° to about 500° F. at a pressure ranging from about 90 to about 150 atmospheres.

4. A process according to claim 3 where said high pressure steam superheater is supplied with steam at a temperature ranging from about 550° to about 650° F. at a pressure ranging from about 90 to about 150 atmospheres and where said steam is superheated by said exhaust gas to a temperature ranging from about 800° to about 1000° F.

5. A process according to claim 4 where said water heated in said high pressure feedwater heater is converted to steam in a separate evaporator and then fed to said high pressure steam superheater.

6. A process according to claim 4 where at least two high pressure feedwater heaters are present.

7. A process for producing high pressure steam using gas turbine exhaust, a waste heat exchanger and a separate evaporator outside said waste heat exchanger comprising passing said exhaust through said waste heat exchanger, where said exhaust first contacts a high pressure steam superheater, and then said exhaust contacts a high pressure feedwater heater.

8. A process according to claim 7 where said water from said high pressure feedwater heater is converted to steam in said separate evaporator and then fed to said high pressure steam superheater.

9. A process according to claim 7 where said exhaust gas ranges from a temperature of about 900° to about 1200° F.

10. A process according to claim 7 where said high pressure feedwater heater is supplied with water at a temperature of about 200° to about 500° F. at a pressure ranging from about 90 to about 150 atmospheres.

11. A process according to claim 7 where said high pressure steam superheater is supplied with steam at a temperature ranging from about 550° to about 650° F. at a pressure ranging from about 90 to about 150 atmospheres and where said steam is superheated by said exhaust gas to a temperature ranging from about 800° to about 1000° F.

12. A heat recovery system comprising a gas turbine, a waste heat exchanger and a separate evaporator outside said waste heat exchanger wherein said waste heat exchanger comprises means for passing exhaust gas from said turbine to said exchanger, a high pressure steam superheater, and a high pressure feedwater heater.

13. A heat recovery system according to claim 12 further comprising means for passing the liquid heated in said high pressure feedwater heater to said evaporate and means for passing steam formed in said evaporator to said high pressure steam superheater.

* * * * *